United States Patent
Xue

(10) Patent No.: US 11,650,342 B2
(45) Date of Patent: May 16, 2023

(54) METHOD FOR EXPLORING PASSIVE SOURCE SEISMIC FREQUENCY RESONANCE

(71) Applicant: BEIJING PETROSOUND TECHNOLOGY CO., LTD., Beijing (CN)

(72) Inventor: Aimin Xue, Beijing (CN)

(73) Assignee: BEIJING PETROSOUND TECHNOLOGY CO., LTD., Beijing (CN)

( * ) Notice: Subject to any disclaimer, the term of this patent is extended or adjusted under 35 U.S.C. 154(b) by 417 days.

(21) Appl. No.: 16/562,345

(22) Filed: Sep. 5, 2019

(65) Prior Publication Data

US 2020/0200932 A1 Jun. 25, 2020

(30) Foreign Application Priority Data

Dec. 25, 2018 (CN) .......................... 201811587566.3

(51) Int. Cl.
*G01V 1/32* (2006.01)
*G01V 1/28* (2006.01)

(52) U.S. Cl.
CPC .............. *G01V 1/325* (2013.01); *G01V 1/288* (2013.01); *G01V 2210/123* (2013.01); *G01V 2210/43* (2013.01)

(58) Field of Classification Search
CPC .. G01V 1/325; G01V 1/288; G01V 2210/123; G01V 2210/43; G01V 1/30; G01V 1/28
See application file for complete search history.

(56) References Cited

U.S. PATENT DOCUMENTS

| | | | |
|---|---|---|---|
| 9,279,897 B2* | 3/2016 | Zuercher | G01V 1/32 |
| 2011/0134718 A1* | 6/2011 | van Borselen | G01V 1/3808 367/24 |
| 2019/0055836 A1* | 2/2019 | Felkl | G01V 1/48 |

FOREIGN PATENT DOCUMENTS

| | | |
|---|---|---|
| CN | 103675917 B | 8/2016 |
| CN | 106371138 B | 10/2018 |
| CN | 107918142 B | 7/2019 |
| CN | 107526103 B | 8/2019 |

* cited by examiner

*Primary Examiner* — Mohammad K Islam

(57) ABSTRACT

The invention discloses a method for exploring passive source seismic frequency resonance, which includes the following steps: Step 1: collecting, with a detector, a response signal of underground medium to form seismic time series data; Step 2, transforming the data collected in step 1 into frequency domain data, via Fourier transformation; Step 3, performing frequency domain superposition on the data at a same detection point processed through step 2, to form frequency domain amplitude superposition data; Step 4, converting, through a correction with a standard well parameter, frequency domain data processed through step 3 into depth data; Step 5, processing the data obtained in step 4 to obtain imaging data Image$_{(d)}$, where the imaging data Image$_{(d)}$ is apparent wave impedance ratio or apparent wave impedance changing as depth. The method can perform spatial and attribute imaging of the underground medium by using the seismic wave resonance principle.

8 Claims, 4 Drawing Sheets

US 11,650,342 B2

METHOD FOR EXPLORING PASSIVE SOURCE SEISMIC FREQUENCY RESONANCE

CROSS-REFERENCE TO RELATED APPLICATIONS

This application claims the benefit of priority from Chinese Patent Application No. CN201811587566.3, filed on Dec. 25, 2018. The content of the aforementioned application, including any intervening amendments thereto, is incorporated herein by reference in its entirety.

TECHNICAL FIELD

The invention relates to the field of seismic exploration, and in particular to a method for exploring passive source seismic frequency resonance.

BACKGROUND OF THE PRESENT INVENTION

Conventional seismic exploration techniques are techniques for exploration in the time domain. Except surface wave exploration which uses the velocity frequency dispersion characteristics of near-surface waves to perform spatial imaging and attribute imaging on the underground medium, all other seismic exploration techniques determine the spatial location and attribute characteristics of the exploration target by the wave field travel time. Conventional seismic exploration and surface wave seismic exploration techniques have been developed and are widely used in geosciences such as resource environment and engineering geology.

SUMMARY OF THE PRESENT INVENTION

The object of the present invention is to provide a method for exploring passive source seismic frequency resonance, which can perform spatial and attribute imaging of the underground medium by using the seismic wave resonance principle.

To achieve the above objectives, a method for exploring passive source seismic frequency resonance is provided in the invention, the method including steps of: Step 1, collecting, with a detector, a response signal of underground medium to form seismic time series data; Step 2, transforming the data collected in step 1 into frequency domain data, via Fourier transformation; Step 3, performing frequency domain superposition on the data at a same detection point processed through step 2, to form frequency domain amplitude superposition data $Amp_{(f)}$; Step 4, converting, through a correction with speed and standard well parameters, frequency domain data processed through step 3 into depth domain data, wherein:

if the detector of step 1 collects single horizontal component data, depth domain spectral amplitude $\Gamma_{(d)}=Amp_{(d)}$ is a single component spectral amplitude; if the detector of step 1 collects multi-component data, two horizontal components are combined to obtain a depth domain spectral amplitude $$\Gamma_{(d)} = \sum_{i=1}^{2} Amp_{d(i)}/2,$$

and a vertical component forms amplitude spectrum $\Gamma_{(d)}$ alone; and the amplitude spectrum corrected with the standard well parameter is then converted to data property in depth domain, which is apparent wave impedance ratio data and is converted into apparent wave impedance data via integral transformation; and Step 5, performing image visualization processing on the data obtained in step 4 to obtain apparent wave impedance ratio or apparent wave impedance imaging data $Image_{(d)}$, or directly outputting the data as text data to facilitate image processing with other visualization software.

Preferably, the seismic time series data is subjected to outlier elimination, automatic gain and geometric position loading.

Preferably, prior to step 3, noise suppression is performed on the frequency domain data and absorption attenuation at different frequencies is compensated or not as needed.

Preferably, steps 2 to 5 are repeated for data collected at each detection point to obtain the apparent wave impedance ratios or apparent wave impedance imaging data of an entire section.

Preferably, in the step 1, a minimum frequency for collecting the response signal of the underground medium is required to be lower than $F_{min}=0.25 \cdot V/D_{max}$, and a maximum frequency is required to be higher than $F_{max}=0.5 \cdot V/D_{min}$, where $D_{min}$ is a minimum depth of measurement, $D_{max}$ is a maximum depth of measurement, and V is an average velocity of the underground medium to be measured.

Preferably, in the step 1, a time length for collecting the response signal of the underground medium needs to be greater than $10/F_{min}$, and a data sampling interval $\Delta T$ during the data collection meets $$\Delta T < \frac{1}{F_{max}}.$$

Preferably, a time window for performing automatic gain on the data is longer than $1/F_{min}$.

Preferably, a time length of the time domain data for the Fourier transform required in step 2 is greater than $1/F_{min}$.

Preferably, the standard well parameter in step 4 is an actual geological parameter near the detection point, or a standard well geological parameter artificially established according to an exploration accuracy requirement; a seismic wave amplitude $U_I$ under a standard well is obtained by applying following formula:

$$U_I \cdot \Gamma = U_M$$

where $U_M$ is a seismic wave amplitude measured on ground, and $\Gamma$ is a wave field amplification factor after resonance occurs; and the wave field amplitude $U_I$ under the standard well is used to calibrate a seismic wave field near the detection point.

Compared with the prior art, the invention has the following beneficial effects: in the method of the present invention, an elastic wave transfer function is obtained from the resonance effect of underground medium acted to environmental vibration, thereby imaging the wave impedance or its ratio of the underground medium. Rather than depending on the interface reflection coefficient, the method of the invention depends on the wave impedance ratio inside the medium and adopts the passive source; the method has the function of finely exploring the change of the medium property. Therefore, the present invention solves the problem of detecting density variation that is difficult in conventional seismic exploration, and solves the problem of blind zone in conventional seismic exploration at initial arrival of seismic data near the ground. Furthermore, the difficulty in imaging caused by rapid change of transverse velocity and density in vertical faultage is overcame, especially achieving fine distinction of internal differences of complex medium and providing an economic and rapid solution for seismic exploration, especially shallow seismic exploration, in complex structural areas.

DETAILED DESCRIPTION OF THE PRESENT INVENTION

Figure 1:
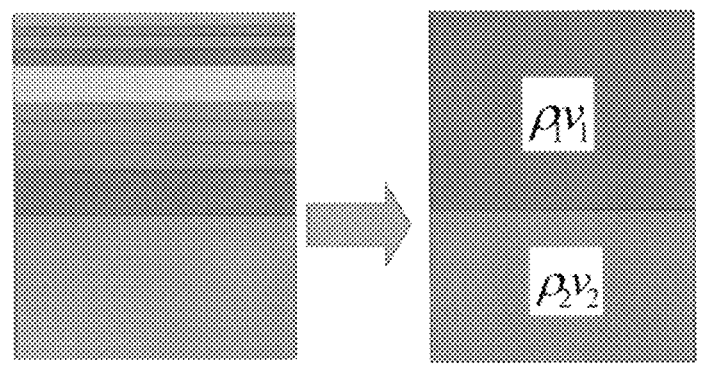
FIG. 1 is a diagram showing multiple stratums being equivalent to an upper stratum of a uniform half space by applying the equivalent layer concept.

Although the specific embodiments of the present invention are described in detail below with reference to the drawings, it is understood that the scope of the present invention is not limited by the specific embodiments.

Unless otherwise stated, the use of the term "comprising" or variations such as "includes" or "comprises", etc., is to be understood to include the recited elements or components while other components or components are not excluded.

First, the basic principle of the invention will be explained.

Any object, from the large one as the earth to the small ones as the microelectronics, has its own natural frequency, and its natural frequency is different due to its different material composition, geometry, structure and size. The natural frequency is a natural attribute given to object by nature. When a vibration acts on the object, the object has to respond accordingly. When the frequency of the vibration is consistent with the natural frequency of the object, the object will resonate to amplify the amplitude of the vibration. Elastic seismic waves are rich in frequency components. If seismic waves propagate to the ground through reflection or refraction below the ground, a stratum with a natural frequency will be excited to resonate by seismic waves of the same frequency, and the underground vibrations U received at the surface will be a function of G and M:

$$U(\omega C) \propto G(\omega, C) \cdot M(\cdot C) \quad (A1)$$

The M function is a transfer function of the wave field when propagating from bottom to top, and G is a function characterizing geometric features. In passive source seismic exploration, since the received signals are mostly from environmental noise away from the seismic source, the G function can be considered as a constant in the statistical context of long-term observations. Thus, the long-term observed data signal is statistically only a function of the underground medium transfer function M.

Assuming that the earth surface is a layered medium, in the case of a layered medium on an upper layer of the uniform ground (C is complex velocity), the wave equation is:

$$C_{(\omega)}^2 \frac{\partial^2 u}{\partial^2 Z} = \frac{\partial^2 u}{\partial^2 t} \quad (A2)$$

The amplitude function of the solution (when the geometric function G is 1) can be expressed as:

$$\text{Amp}_{(\omega)} = \frac{1}{\sqrt{\text{Re}_{N+1}^2 + \text{Im}_{N+1}^2}} \quad (A3)$$

where:

$$\text{Re}_j = \text{Re}_{j-1} \cos S_{j-1} - \text{Im}_{j-1} \sin S_{j-1} \quad (A4)$$

$$\text{Im}_j = \alpha_{j-1}(\text{Im}_{j-1} \cos S_{j-1} + \text{Re}_{j-1} \sin S_{j-1}) \quad (A5)$$

$$S_j = K_j \cdot H_j$$

$$K_j = \frac{\omega}{C_{j(\omega)}}$$

$$\alpha_j = \frac{\rho_j C_{j(\omega)}}{\rho_{j+1} C_{j+1(\omega)}} \quad (A6)$$

where ρ is the density.

For a single layer model on an upper layer of the uniform ground, when S=90° (resonance occurs), the formula (A3) becomes $$\text{Amp}_{(\omega)} = \frac{\rho_2 v_2}{\rho_1 v_1} \quad (A7)$$

It can be seen from (A7) that, when the stratum resonates and the geometric function is 1, the amplitude value of the wave field is the transfer function, and its value is a ratio of a lower layer wave impedance to an overburden wave impedance. That is, if $$kh = \frac{2\pi f}{v} h$$

of the medium is close to $$\frac{\pi}{2},$$

there will be only a pure relationship between the medium wave impedance ratio α and the transfer function. This law of frequency resonance is universal. For a medium at different thickness layer, a matching frequency $f_0$ that reaches the resonance is found by only adjusting kh, and at the same time, a function $\text{Amp}_{(\omega)}$ representing only the material attribute related to the resonance is obtained.

The equivalent layer concept setting of the present invention:

As shown in FIG. 1, for the case of multiple layers of media, it is generally equivalent to one or a few layers in geophysics to simplify processing. A thickness of the equivalent layer is a sum of thicknesses of the multiple layers of media, and wave impedance $\rho_s v_s$ is a root mean square of wave impedances of the multiple layers of media, then:

$$\rho_s v_s \approx \left[\sum_{i=1}^{n}(\rho_i v_i)^2 \Delta h_i / \sum_{i=1}^{n} \Delta h_i \right]^{1/2} \quad (A8)$$

$$\Delta H = \sum_{i=1}^{n} [\Delta h_i] \quad (A9)$$

In the case of multiple layers of media, the transfer function amplitude expression of the n-layer case can be obtained.

$$\mathrm{amp}_{s(\omega)n} = \frac{\rho_{n+1} v_{n+1}}{[\rho_s v_s]_n} \quad (A10)$$

It can be seen that the measured transfer function should be a wave impedance ratio which changes from high frequency to low frequency in the frequency domain and changes from shallow depth to deep depth in the depth domain, which is called as apparent wave impedance ratio. According to common sense analysis, the wave impedance near the ground is measurable or known, and the apparent wave impedance can be obtained by an integral ratio function.

Figure 2:
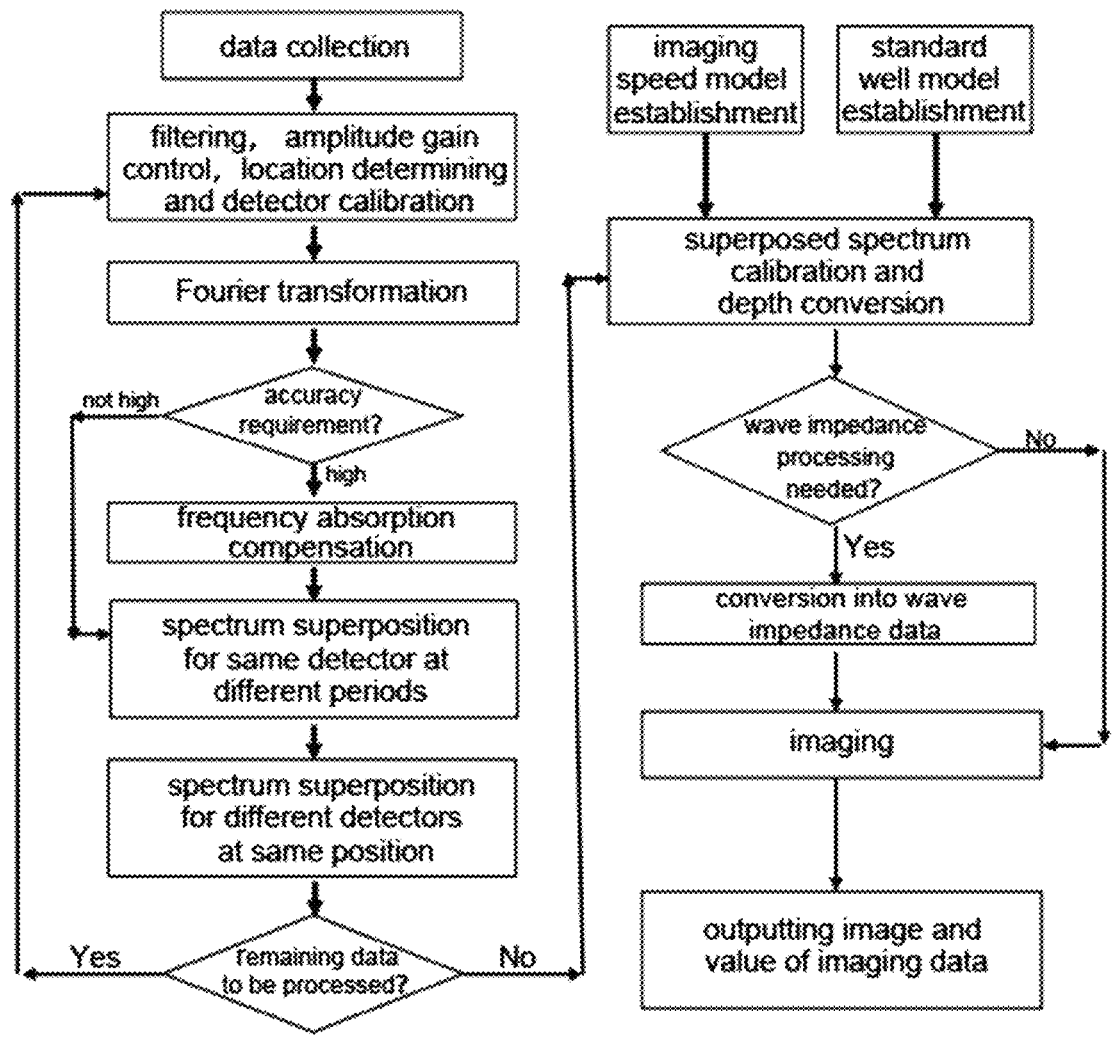
FIG. 2 is a flow chart of a method for exploring passive source seismic frequency resonance in accordance with the present invention.

Based on the above, as shown in FIG. 2, a method for exploring passive source seismic frequency resonance according to an embodiment of the present invention includes the following steps.

Step 1, data collection: collecting, with a detector, a response signal of underground medium to form seismic time series data. In this step, a single horizontal component or multi-component seismic data collection method is generally applied, and the response signal of underground medium is collected to form seismic time series data of amplitude versus time. There may be multiple detectors at the place to be detected, and data collection is performed at different time points. The collected data may be single component data or multi-component data, and vibration waves excited by non-human active excitation may be collected.

Step 2, Fourier transformation transforming the data collected in step 1 into frequency domain data, via Fourier transformation.

Preferably, the seismic time series data may be subjected to outlier elimination, automatic gain, and geometric position loading prior to the Fourier transformation. Data processing, such as outlier elimination, noise suppression, and automatic gain control on the data and geometric position confirmation for the signal collecting detector, is a preliminary data processing which can be increased or decreased or fully implemented as needed in specific data processing.

Step 3, performing frequency domain superposition on the data processed by step 2 that are at a same detection point, to form frequency domain amplitude superposition data $\mathrm{Amp}_{(f)}$. The superposition step includes superposition of respective Fourier spectrums of the same frequency length that are obtained from time domain data collected in step 1 being processed through steps 2-4. The superposition further includes superposition of the Fourier spectrums that are obtained from the time domain data collected by the different collecting devices at the same place at the same time point or at different time points in step 1 being processed through steps 2-4. Eventually, a frequency domain amplitude superposition data $\mathrm{Amp}_{(f)}$ will be formed at the location of the detector.

Step 4, time-depth conversion of the superposed spectrum. In this step, the frequency domain data processed through step 3 is converted, according to a speed parameter and a standard well parameter, into apparent wave impedance or a ratio thereof in depth domain.

If the detector of step 1 collects single horizontal component data, the depth domain spectral amplitude $\Gamma_{(d)} = \mathrm{Amp}_{(d)}$ is a single component spectral amplitude; if the detector of step 1 collects multi-component data, two horizontal components are combined to obtain a depth domain spectral amplitude $$\Gamma_{(d)} = \sum_{i=1}^{2} \mathrm{Amp}_{d(i)}/2,$$

and a vertical component forms the amplitude spectrum $\Gamma_{(d)}$ alone or together with two horizontal components via energy synthesis as needed. The amplitude spectrum corrected with the standard well parameter is then converted to the data property in the depth domain, which is the apparent wave impedance ratio data and is converted into the apparent wave impedance data via integral transformation.

In the above step, the apparent wave impedance ratio converted from the seismic data collected in step 1 is a ratio of the lower layer wave impedance to the average wave impedance of the overlying stratum, which changes as the depth. i.e., $$\Gamma_{(n)} = \frac{\rho_{n+1} v_{n+1}}{\left[\sum_{i=1}^{n}(\rho_i v_i)^2 \Delta h_i / \sum_{i=1}^{n} \Delta h_i \right]^{1/2}}$$

where $\Gamma_n$ is the apparent wave impedance ratio at the depth of the n-th layer, $\rho_i$ is the density at the depth of the i-th layer; $v_i$ is the shear wave velocity at the depth of the stratum; $\Delta h_i$ is the thickness of the i-th stratum.

Step 5: performing image visualization processing on the data obtained in step 4 to obtain imaging data Image(d). The imaging data Image(d) is the apparent wave impedance ratio as a function of depth or the apparent wave impedance obtained by integrating the apparent wave impedance ratio. The data is visualized to obtain the apparent wave impedance ratio or the apparent wave impedance imaging data Image(d). The data can also be directly outputted as text data without visualization to facilitate image processing with other visualization software. In this step, the data processed through step 5 is generally further filtered. Finally, an imaging section is completed based on the imaging data Image(d).

Specifically, the imaging data Image(d) is the underground wave impedance data and the ratio data thereof obtained by correcting the amplitude of the wave field with the velocity and standard well model parameters in the above steps 1 to 5. The imaging result, an approximation as compared to the real geological parameter, is therefore called the apparent wave impedance or a ratio thereof.

As a preferred embodiment, prior to step 4, noise suppression is performed on the frequency domain data and the absorption attenuation of the medium at different frequencies is compensated. In this scheme, noise suppression on the data and seismic data processing for the purpose of compensating absorption attenuation at different frequencies are auxiliary data processing, which can be optional based on data collection quality and expected requirements on final results in practical operation. The standard well parameter selected for data processing in step 4 may be a geological parameter near the actual measurement point, or may be the standard well geological parameter artificially determined according to the exploration accuracy requirement. These parameters include depth, wave impedance, and geographic coordinate position. In accordance with the seismic wave amplitude spectrum actually measured based on known standard well parameter and standard well ground location, the seismic wave amplitude $U_I$ under the standard well is obtained by applying the following formula:

$$U_T \Gamma = U_M$$

where $U_M$ is the seismic wave amplitude measured on the ground, and $\Gamma$ is the wave field amplification factor after resonance occurs. The amplification factor $\Gamma$ is the ratio of upper layer and lower layer wave impedances measured in the well. From this formula, the in-well wave field amplitude $U_I$ is obtained, thereby calibrating the seismic wave field near the detection point and then obtaining the apparent wave impedance ratio or the apparent wave impedance of the entire section.

As a preferred embodiment, steps 2 to 5 are repeated for the data collected at each detection point to obtain the apparent wave impedance ratio imaging data of the entire section.

As a preferred embodiment, in step 1, a minimum frequency for collecting the response signal of the underground medium is required to be lower than $F_{min}=0.25 \cdot V/D_{max}$, and a maximum frequency is required to be higher than $F_{max}=0.5 \cdot V/D_{min}$, where $D_{min}$ is the minimum depth of measurement, $D_{max}$ is the maximum depth of measurement, and V is the average velocity of the underground medium to be measured.

As a preferred embodiment, in step 1, a time length for collecting the response signal of the underground medium should be greater than $10/F_{min}$, and the data sampling interval during the data collection should be $$\Delta T < \frac{1}{F_{max}}.$$

As a preferred embodiment, when the automatic gain processing is performed on the data in step 2, the time window is longer than $1/F_{min}$. In this step, when the data is subjected to data processing of automatic gain control, the time window should be longer than $1/F_{min}$, to avoid distortion of the signal characteristic relationship of the desired frequency.

As a preferred embodiment, the time length of the time domain data for Fourier transform required in step 3 is greater than $1/F_{min}$.

As a preferred embodiment, the velocity in step 5 is the stratum velocity below each physical measurement point in the whole region. According to the exploration accuracy requirements, it may also be a representative velocity of underground medium at one or several points.

As a preferred embodiment, the establishment of the standard well parameter model in step 5 may be an actually measured in-well parameter or an artificially established well parameter model according to the exploration accuracy requirement. The standard well parameter model is established to uniformly obtain a statistic standard wave field amplitude at different frequencies on local earth surface. If allowed, multiple standard well parameter models can be defined to obtain standard field amplitudes at multiple locations, so as to improve the accuracy of the correction.

Explorations practiced with the method for exploring passive source seismic frequency resonance according to the embodiment have verified its scientificity.

Example 1

Figure 3:
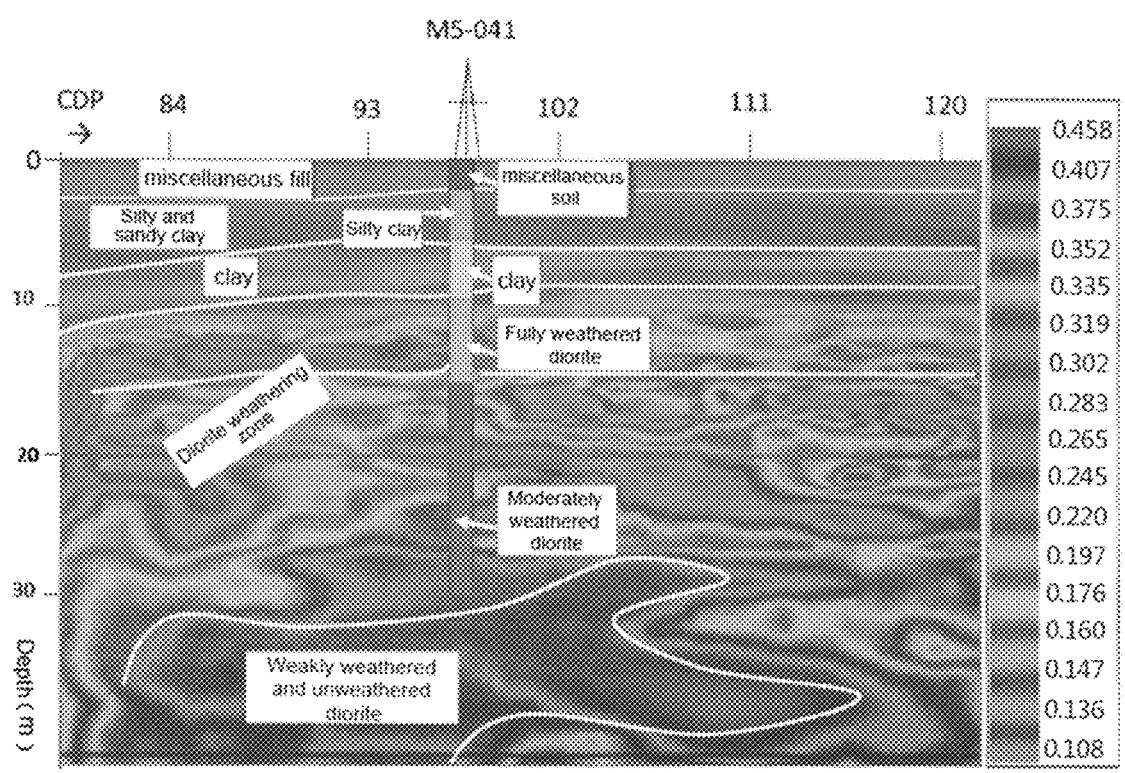
FIG. 3 is a diagram of comparison between the method for exploring passive source seismic frequency resonance in accordance with the present invention and drilling data.

In October 2017, a geological survey was carried out using the mixed source surface wave and seismic frequency resonance technology in the central urban area of city Jinan to ascertain weathering crust depth and geological phenomena such as faults and karst. FIG. 3 is a section in the survey of the weathering crust in which the seismic frequency resonance method is applied. As can be seen in FIG. 3, this technique clearly reveals the geological features and thickness of weathering crusts of different degrees of weathering.

Example 2

Figure 4:
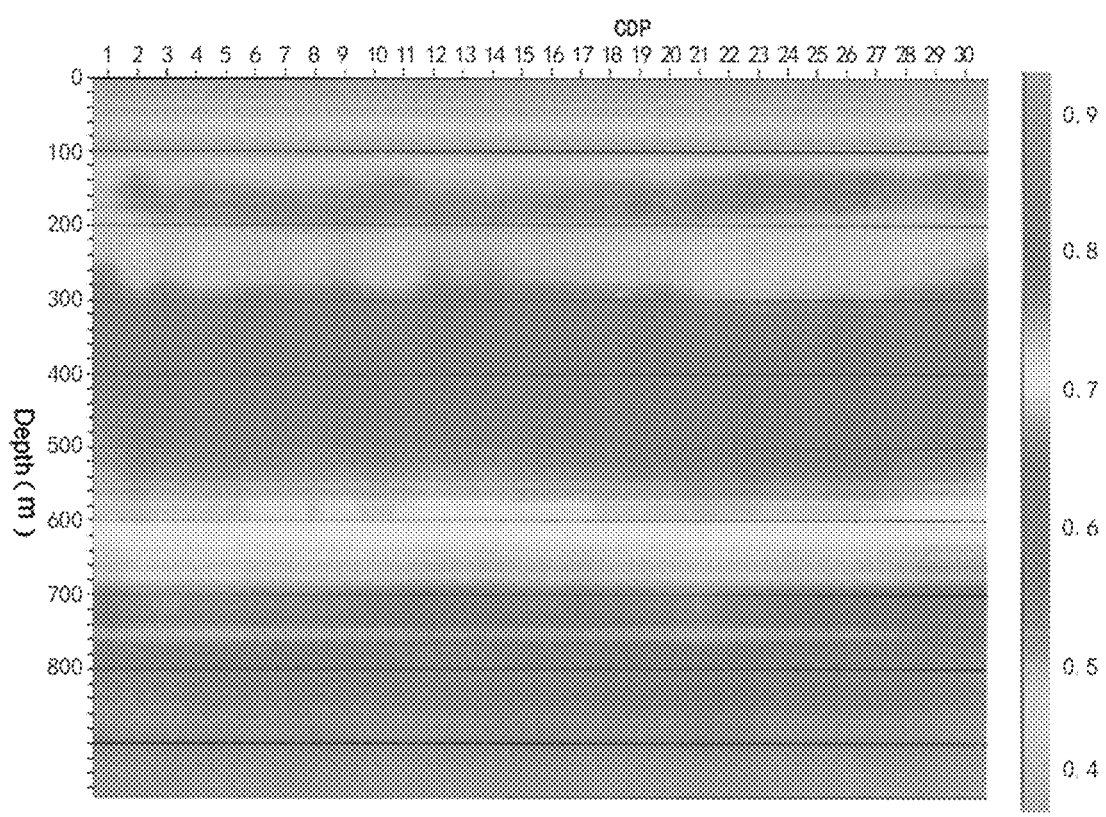
FIG. 4 is an experimental diagram for detecting a depth of 1000 meters using the method for exploring passive source seismic frequency resonance in accordance with the present invention.

In March 2018, experiments of the frequency resonance exploration method were carried out on 1000 m depth sedimentary rock stratum in the northern part of city Beijing, in order to investigate the ability and resolution of the method for deep exploration. 0.2 Hz detectors were used to collect data for 3 hours at each of physical points at a distance of 20 meters. FIG. 4 clearly reveals a 20-meter thick argillaceous sandstone layer at a depth of 750-meter. It is indicated that the exploration method of the invention also has good resolution for deep exploration.

In summary, the method for exploring passive source seismic frequency resonance of the present embodiment allows obtaining geological image and geological property of exploration object from environmental noise signal data collected from the ground or the well without using artificial source. Different from conventional seismic exploration imaging dependent on wave field travel time and surface wave exploration imaging dependent on dispersion curve inversion, the frequency and wavelength of the signal and the standard reference well parameters are used to calculate the depth, to define the location of the underground medium and to image the underground medium. Unlike conventional seismic exploration technique that mainly rely on parameters such as reflection coefficient and reflection time at wave impedance interface for underground medium exploration, and unlike surface wave exploration technology that relies on surface wave velocity parameter for underground medium exploration, in the exploration technology of the present invention, an elastic wave transfer function is obtained from the resonance effect of underground medium acted to environmental vibration, thereby imaging the wave impedance and its ratio of the underground medium. Rather than depending on the interface reflection coefficient, the method of the invention depends on the wave impedance ratio inside the medium and adopts the passive source mode, the method has the function of finely exploring the change of the medium property. Therefore, the present invention solves the problem of detecting density variation that is difficult in conventional seismic exploration, and solves the problem of blind zone in conventional seismic exploration at initial arrival of seismic data near the ground. Furthermore, the difficulty in imaging caused by rapid change of transverse velocity and density in vertical faultage is overcame, especially achieving fine distinction of internal differences of complex medium and providing a solution for rapid seismic exploration, especially shallow seismic exploration, in complex structural areas. The method is a new passive seismic exploration technology in frequency domain applicable in fields such as engineering geology and hydrogeological exploration, geological hazard assessment, road underground defect detection, mineral resource exploration, environmental protection and underground debris exploration.

The foregoing description of the specific exemplary embodiments of the present invention is for the purpose of illustration and demonstration. The description is not intended to limit the invention to the precise forms disclosed. It will be apparent that many changes and modifications can be made in light of the above teaching. The embodiments are chosen and described in order to explain the particular principle and practical implementation of the invention, thus those skilled in the art will be able to implement and utilize various exemplary embodiments of the invention and various alternatives and modifications. The scope of the invention is intended to be defined by the claims and their equivalents.

What is claimed is:

1. A method for seismic exploration using passive source seismic frequency resonance, comprising steps of:
   a) collecting, with a detector, a response signal of an underground medium at a detection point to form seismic time series data;
   b) transforming the data collected in step a) into frequency domain data, via Fourier transformation;
   c) performing frequency domain superposition on the data at the detection point processed through step b), to form frequency domain amplitude superposition data $Amp_{(f)}$;
   d) converting, through a correction with speed and standard well parameters, frequency domain data processed through step c) into depth data, wherein:
      if the detector of step a) collects single horizontal component data, depth domain spectral amplitude $\Gamma_{(d)} = Amp_{(d)}$ is a single component spectral amplitude;
      if the detector of step a) collects multi-component data, two horizontal components are combined to obtain a depth domain spectral amplitude $$\Gamma_{(d)} = \sum_{i=1}^{2} Amp_{d_{(i)}}/2,$$

and a vertical component forms amplitude spectrum $\Gamma_{(d)}$ alone; and the amplitude spectrum corrected with the standard well parameter is then converted to data property in depth domain, which is apparent wave impedance ratio data and is converted into apparent wave impedance data via integral transformation;
   e) performing image visualization on the data obtained in step d) to obtain apparent wave impedance ratio or apparent wave impedance imaging data; and
   f) collecting apparent wave impedance ratio or apparent wave impedance imaging data at each of a plurality of detection points by repeating steps b) to e) and generating a seismic image.

2. The method according to claim 1, wherein the seismic time series data is subjected to outlier elimination, automatic gain and geometric position loading.

3. The method according to claim 1, wherein prior to step c), noise suppression is performed on the frequency domain data and absorption attenuation at different frequencies is compensated or not as needed.

4. The method according to claim 1, wherein in the step a), a minimum frequency for collecting the response signal of the underground medium is required to be lower than $F_{min} = 0.25 \cdot V/D_{max}$, and a maximum frequency is required to be higher than $F_{max} 0.5 \cdot V/D_{min}$, where $D_{min}$ is a minimum depth of measurement, $D_{max}$ is a maximum depth of measurement, and V is an average velocity of the underground medium to be measured.

5. The method according to claim 4, wherein in the step a), a time length for collecting the response signal of the underground medium needs to be greater than $10/F_{min}$, and a data sampling interval during the data collection needs to be $$\Delta T < \frac{1}{F_{max}}.$$

6. The method according to claim 4, wherein a time window for performing automatic gain on the data is longer than $1/F_{min}$.

7. The method according to claim 1, wherein a time length of the time domain data for the Fourier transform required in step b) is greater than $1/F_{min}$.

8. The method according to claim 1, wherein the standard well parameter in step d) is an actual geological parameter near the detection point, or a standard well geological parameter artificially established according to an exploration accuracy requirement; a seismic wave amplitude $U_I$ under a standard well is obtained by applying following formula:

$$U_I \cdot \Gamma = U_M$$

where $U_M$ is a seismic wave amplitude measured on ground, and $\Gamma$ is a wave field amplification factor after resonance occurs; and the wave field amplitude $U_I$ under the standard well is used to calibrate a seismic wave field near the detection point.

* * * * *